US009181036B2

(12) United States Patent
Woinski et al.

(10) Patent No.: US 9,181,036 B2
(45) Date of Patent: Nov. 10, 2015

(54) AUTOMATIC ROTARY TRANSFER APPARATUS AND METHOD

(71) Applicant: Graham Packaging Company, L.P., York, PA (US)

(72) Inventors: Grzegorz Woinski, Warsaw (PL); Slawomir Strupinski, Warszawa Mazowieckie (PL)

(73) Assignee: Graham Packaging Company, L.P., York, PA (US)

( * ) Notice: Subject to any disclaimer, the term of this patent is extended or adjusted under 35 U.S.C. 154(b) by 24 days.

(21) Appl. No.: 13/778,815

(22) Filed: Feb. 27, 2013

(65) Prior Publication Data

US 2014/0238821 A1 Aug. 28, 2014

(51) Int. Cl.
*B65G 47/24* (2006.01)
*B65G 17/46* (2006.01)
*B65G 29/02* (2006.01)
*B65G 47/84* (2006.01)
(Continued)

(52) U.S. Cl.
CPC .............. *B65G 17/46* (2013.01); *B65G 29/02* (2013.01); *B65G 47/24* (2013.01); *B65G 47/848* (2013.01); *B29C 49/421* (2013.01); *B29C 49/72* (2013.01)

(58) Field of Classification Search
CPC ......... B65G 47/82; B65G 17/46; B29C 49/72
USPC .......................... 198/377.01, 377.1, 378, 376
See application file for complete search history.

(56) References Cited

U.S. PATENT DOCUMENTS

| 4,614,018 | A | 9/1986 | Krall |
| 6,178,608 | B1 * | 1/2001 | Koch ............................ 29/33 P |
| 6,732,498 | B2 * | 5/2004 | Keen et al. ..................... 53/567 |

(Continued)

FOREIGN PATENT DOCUMENTS

| DE | 102008051919 | 4/2010 |
| EP | 0129168 | 12/1984 |

(Continued)

OTHER PUBLICATIONS

International Search Report for International Application No. PCT/US2013/071395 issued on Oct. 30, 2014 by the European Patent Office.

(Continued)

*Primary Examiner* — Ramya Burgess
*Assistant Examiner* — Lester Rushin
(74) *Attorney, Agent, or Firm* — Stradley Ronon Stevens & Young, LLP

(57) ABSTRACT

An automatic rotary transfer apparatus and method for conveying a plurality of lightweight articles, such as empty bottles, at a high speed and, optionally, providing at least one additional function, such as de-flashing, trimming, or inspecting, in a single rotation of the rotary transfer apparatus. The apparatus includes a carriage ring having an outer perimeter defining a plurality of cavities spaced along the outer perimeter. Each cavity is adapted to receive a single article. A drive assembly indexes and rotates the carriage ring about a central axis of rotation and is synchronized to a continuous stream of the plurality of articles from an upstream operation, such as blow molding. The apparatus may further include a modification device, such as a de-flasher or trimmer, and an inspection station with a sensor for discharging damaged or imperfect articles, which performs the functions in a single rotation of the carriage ring.

23 Claims, 12 Drawing Sheets

(51) Int. Cl.
    *B29C 49/42* (2006.01)
    *B29C 49/72* (2006.01)

(56) References Cited

U.S. PATENT DOCUMENTS

| | | | |
|---|---|---|---|
| 7,643,904 B2 * | 1/2010 | Aoyama et al. | 700/248 |
| 7,942,256 B2 * | 5/2011 | Coates | 198/608 |
| D642,065 S | 7/2011 | Araujo et al. | |
| 2009/0000435 A1 | 1/2009 | Harding et al. | |
| 2009/0071799 A1 * | 3/2009 | Nalbach | 198/377.02 |
| 2011/0240673 A1 | 10/2011 | Araujo et al. | |
| 2013/0168206 A1 * | 7/2013 | Winter et al. | 198/470.1 |

FOREIGN PATENT DOCUMENTS

| | | |
|---|---|---|
| EP | 0384453 | 8/1990 |
| EP | 0709317 | 5/1996 |
| EP | 2460747 | 6/2012 |
| FR | 2670191 | 6/1992 |
| GB | 2104028 | 3/1983 |
| JP | 61192612 | 8/1986 |
| JP | 10053328 | 2/1998 |
| WO | 2010/130257 | 11/2010 |
| WO | 2012/144890 | 10/2012 |

OTHER PUBLICATIONS

Annex to Form PCT/ISA/206, Communication Relating to the Results of the Partial International Search issued by the European Patent Office dated Mar. 12, 2014.

OHIM Office for Harmonization in the Internal Market, Trade Marks and Designs—European Community Design No. 001758889-0001 dated Sep. 23, 2010 for a Container; Armel A. Archeny, David Araujo, Graham Packaging Company, L.P.

* cited by examiner

AUTOMATIC ROTARY TRANSFER APPARATUS AND METHOD

TECHNICAL FIELD

The present invention relates generally to rotary transfer apparatus and methods of transporting and processing containers, bottles, and like objects.

BACKGROUND OF THE INVENTION

When articles, such as bottles, are manufactured, the articles may need to undergo a number or series of process steps, such as molding, trimming, finishing, packaging, and the like. Thus, the articles may need to be transported between operations, for example, using a conveyor. Such conveyance apparatus and systems may take up a large amount of floor space or footprint and may not be able to convey the articles in the desired direction or orientation.

In particular, problems arise when the articles need to change from one direction of travel or orientation to another. In typical bottle conveyance systems, a conveyor running in one direction drops the bottles (e.g., through a drop box) onto a bucket conveyor running in a different direction. There is a high rate of error, however, in such a transition. Among other errors, bottles may not drop into the desired location and may not align in a precise manner.

For conveyance systems using a wheel-like system, there have been problems with handling and positioning of the bottles, especially for lightweight (e.g., unfilled) bottles of about 12-35 grams and higher moving at high speeds. For example, lightweight bottles can "jump" or move erratically from the conveyance system, jam the equipment, and cause stoppages at high speeds. Thus, typical conveyance systems may only be able to handle heavier articles, such as filled bottles, or must operate at slower speeds. Some conveyance systems also have chambers that fill with articles by accident. In other words, the chambers on the conveyance systems are not filled in a controlled and reliable manner. In addition, if newly foamed bottles are in direct contact with one another or other surfaces, the bottles can become damaged or stick to one another during transport and handling.

There remains a need, therefore, for a high-efficiency machine suitable for areas with space limitations, which is able to perform a number of different functions including changing the traveling direction of the bottles in a precise and consistent manner.

SUMMARY OF THE INVENTION

To meet this and other needs, and in view of its purposes, the present invention provides for a space-saving, high-efficiency, automatic, rotary transfer apparatus that can be easily adapted to additional functionality. The rotary transfer apparatus is able to handle and accurately position articles moving at high rates of speed, for example, even in the case of bottles which are empty and lightweight (e.g., as compared to filled bottles or heavier articles). In addition, the rotary transfer apparatus is able to perform a number of functions in a single rotation, without necessarily requiring additional downstream operations. For example, the apparatus achieves some or all of the following functions: (1) optimizing the flow of articles by changing a traveling direction of the articles (e.g., pre-formed bottles); (2) increasing the speed and efficiency of article transport and handling while avoiding jamming; (3) separating articles and avoiding physical contact between bottles and between bottles and other objects; (4) engaging and positioning articles in predetermined locations within individual chambers; (5) changing the orientation of the articles (e.g., from a horizontal orientation to a vertical orientation); (6) cutting, separating, or removing waste from the articles (e.g., trimming a tail or a dome); (7) monitoring and inspecting the quality of the articles (e.g., monitoring the molding quality and the trimming process); (8) removing articles which do not pass quality standards (e.g., damaged or imperfect articles); (9) unloading the articles in a specific and reliable manner (e.g., positioning the articles in a desired orientation and traveling direction) for optimum positioning in downstream operations; and (10) other functions, such as adding a hook closing or similar post-finishing functions.

In one embodiment, the present invention provides an automatic rotary transfer apparatus for conveying a plurality of lightweight articles at a high speed. The apparatus includes a carriage ring having an outer perimeter defining a plurality of cavities spaced along the outer perimeter and each cavity is adapted to receive a single article. The rotary transfer apparatus further includes a vacuum device to help position and hold each article in its respective cavity and at least one sensor to determine if each cavity is occupied by the single article. Thus, the efficiency of the automatic rotary transfer apparatus can be optimized such that 100% of the cavities are occupied during each rotation. The rotary transfer apparatus also includes a drive assembly, which helps ensure high precision and repeatability in high speed, to index and rotate the carriage ring about a central axis of rotation and synchronized to a continuous stream of the plurality of articles from an upstream operation. The carriage ring is adapted to receive each article in a first orientation traveling in a first direction and the carriage ring is adapted to discharge each article in a second orientation traveling in a second direction. The first orientation may differ from the second orientation and the first direction differs from the second direction.

Unlike the ease at which heavy articles (e.g., filled bottles) can be handled, positioned, conveyed, and reoriented, lightweight articles are difficult to do the same. The present invention allows, however, for the conveyance of lightweight articles (such as hollow or empty bottles or containers, for example) formed from an upstream blow molding operation. Lightweight, empty bottles may weigh about 8 grams to about 35 grams, for example. In addition, the lightweight articles may be conveyed at high speeds in a reliable and consistent manner. For example, the speed of the automatic rotary apparatus may be timed to synchronize with upstream operations, such as to accommodate the output from blow molding operations, or downstream operations. The present invention allows for the carriage ring to be operated stably at a speed of about 160 cycles per minute to about 200 cycles per minute. For example, the carriage ring may convey about 2-3 bottles per second from the first position to the second position (e.g., from the entrance to the exit) of the carriage ring in a single rotation. For example, the front entrance to the drum can have an empty chamber while the rest of the chambers in rotation are filled by bottles. As new bottles enter, another is dropped from the exit chamber onto a take-out conveyor.

In addition, the conveyance of the articles can be timed and controlled such that the articles avoid direct contact with one another. Direct contact between the bottles may be detrimental. For example, bottles produced through a blow molding operation may not be fully set or hardened or may have a glossy surface during transport; contact with adjacent bottles may cause the bottles to stick to one another resulting in damage to the bottles. Thus, the rotary transfer apparatus may be timed such that the plurality of articles are separated a distance from one another during rotation and once discharged from the carriage ring.

In one example, the articles are organized length-to-length before entering the carriage ring, and the articles are organized side-by-side after leaving the carriage ring. Depending on the upstream operations, the articles may be oriented horizontally when entering the carriage ring. When exiting the carriage ring, the articles may be oriented horizontally or vertically. The traveling direction exiting the carriage ring may be oriented at about 90° relative to the traveling direction of the articles entering the carriage ring. For articles oriented horizontally in both the first and second traveling directions, the carriage ring may be substantially vertically oriented. For articles oriented horizontally in the first traveling direction and vertically in the second traveling direction, the carriage ring may be oriented at an angle of about 30°-60° relative to horizontal (e.g., the center axis of rotation is provided at the angle).

The articles may be conveyed to and from the rotary transfer apparatus, for example, using a conveyor, such as a cleated conveyor, a flat belt conveyor, fan belt conveyor, bucket conveyor, or similar conveyance apparatus. Typically, bottles exiting the unit may be arranged in any applicable orientation. According to preferred embodiments of the present invention, bottles entering the unit are conveyed horizontally with the bottle axis substantially aligned with the chamber axis. The articles may be guided into the cavities in the carriage ring by the conveyance apparatus. In addition, the rotary transfer apparatus may include one or more air jets for guiding each article into each cavity. A vacuum device may be provided for holding and securing each article in its respective cavity. One or more sensors may be provided for determining if the cavity is fully and completely occupied by the article. For example, the carriage ring may only rotate and index if the sensor determines that the cavity is fully occupied by the article.

The carriage ring may define a plurality of cavities, which are substantially U-shaped. Preferably, each cavity is configured and sized to receive an individual article, such as a single bottle. Each cavity may be sized and dimensioned based on the overall dimensions (e.g., outer radius) and shape of the bottle. In one embodiment, the carriage ring comprises 12 or more equally spaced cavities around the outer perimeter.

The rotary transfer apparatus may be designed to provide for a number of different functions in a single rotation of the carriage ring. For example, the rotary transfer apparatus may further comprise a device for performing at least one additional function in a single rotation of the carriage ring, such as de-flashing, trimming, inspection, separating, hook closing, and combinations of such operations. Thus, the rotary transfer apparatus is able to perform a number of different functions in a single-stage operation. The need for downstream operations, such as de-flashing and trimming, is made obsolete, which provides for performance efficiencies and cost savings in the overall operation. Accommodating multiple functions in one device minimizes losses and increases final efficiency versus multiple single, specialized devices for each function, which can potentially generate sum losses on each of them.

In one embodiment, the rotary transfer apparatus is suitable for modifying, inspecting, and changing a traveling direction or an orientation of a plurality of articles. The rotary transfer apparatus includes a conveyor traveling in a first direction for moving a plurality of articles in a first orientation; a carriage ring having an outer perimeter defining a plurality of cavities spaced along the outer perimeter and each cavity adapted to receive a single article from the conveyor; a drive assembly to index and rotate the carriage ring about a central axis; and an unloading location to remove each article from the carriage ring. The carriage ring is adapted to discharge each article in a second orientation traveling in a second direction different from the first direction. The articles may leave the carriage ring via a chute, a second conveyor operating in the second direction, or the like.

In addition, the apparatus may include an inspection station including one or more sensors to inspect the plurality of articles and a discharge area for discharging damaged articles. The discharge area may include a moveable gate (e.g., a slide gate) adapted to open for the damaged articles. The apparatus may also include a modification device to modify the plurality of articles. The modification device may include, for example, a trimmer comprising a toothed metal cutting disc for separating or cutting waste or scrap material from the articles, a hook closing station for trimming and bending a hook on the article, or other similar operations.

In another embodiment of the present invention, a method for conveying a plurality of lightweight articles at a high speed includes conveying in a first direction a plurality of articles in a continuous stream in a first orientation from an upstream operation; introducing each of the plurality of articles into one of a plurality of cavities at a first position along a perimeter of a carriage ring and holding each article in each respective cavity in the carriage ring; rotating and indexing the carriage ring about a central axis of rotation synchronized to the continuous stream of the plurality of articles from the upstream operation where the carriage ring only rotates and indexes if a sensor determines the cavity is fully occupied by the article at the first position such that 100% of the cavities are occupied; and removing each of the plurality of articles in a second orientation from the carriage ring at a second position along the perimeter of the carriage ring. The plurality of articles are traveling in a second direction different from the first direction.

For articles changing from a horizontal orientation to a vertical orientation, each of the plurality of articles enters into the cavity in the first position at about a 12 o'clock position and exits the cavity in the second position at about a 6 o'clock position when the carriage ring rotates in a clockwise manner. For articles maintaining a horizontal orientation from the first direction to the second direction but changing from a length-to-length to a side-by-side configuration, each of the plurality of articles enters into the cavity in the first position at about a 9 o'clock position and exits the cavity in the second position after about a 6 o'clock position but before the 9 o'clock position when the carriage ring rotates in a clockwise manner.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 1:
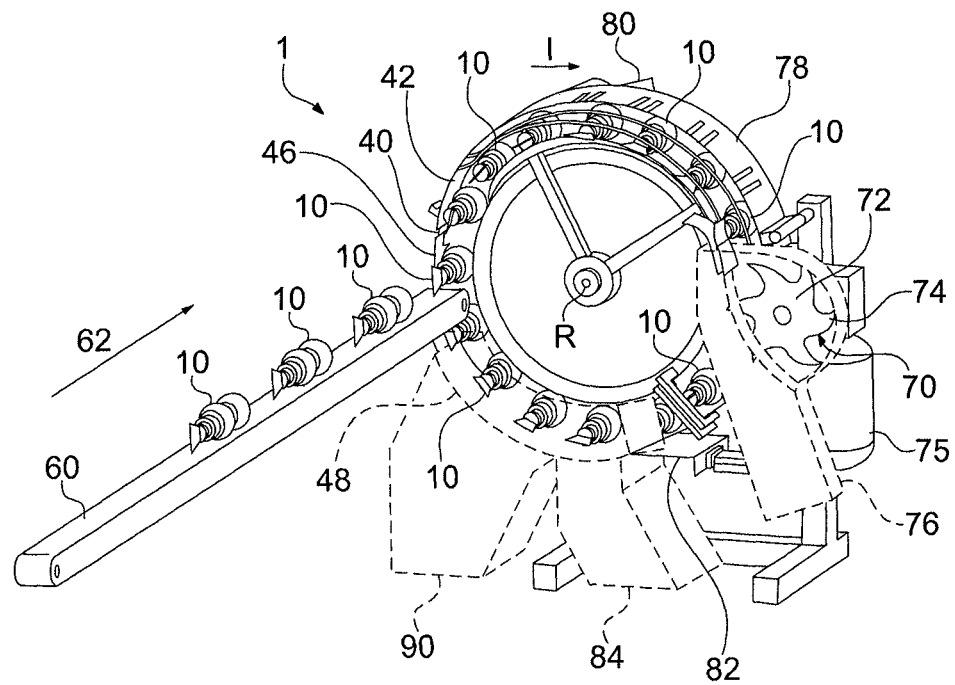
FIG. 1 shows a perspective view of an automatic rotary transport apparatus according to one embodiment of the present invention in a vertical orientation.

The present invention provides for a high-efficiency automatic rotary transport apparatus having a space-saving design. The rotary transfer apparatus is able to handle and accurately position articles moving at a high rate of speed, even in the case of bottles which are empty and lightweight (e.g., as compared to filled bottles or heavier articles). The automatic rotary transport apparatus saves space by having only a small footprint in which to change the direction of transport of the articles and, optionally, to re-orient the articles. The apparatus is also able to perform a number of different functions in a single rotation of the apparatus in a precise and consistent manner. The automatic rotary transport apparatus may incorporate additional functionality, such as de-flashing, quality inspection, trimming or cutting operations, and folding or bending operations, for example, in a single rotation of the apparatus. The present invention also provides a related method for performing the same functions.

As used in this document, "lightweight" is intended to denote an article weighing relatively little and as compared to a heavier article. Primarily, this distinction is made with reference to bottles or containers which are empty or not filled. Thus, a bottle which is empty is lightweight as compared to a similar bottle which is filled (e.g., with a liquid or the like). It will be appreciated by one of ordinary skill in the art, however, that the weight of a bottle may vary depending on the nature of the materials used to make the bottle (e.g., plastic vs. glass), the shape and design of the bottle, the size or volume of the bottle, scrap or waste material adhered to the bottle, and the like. In an exemplary embodiment, the articles are lightweight bottles or containers, which are hollow or empty. For example, the hollow or empty bottles may be plastic bottles formed from an upstream blow molding operation. The lightweight, empty bottles may weigh up to about 35 grams, about 8 grams to about 35 grams, about 10 grams to about 30 grams, or about 12 to about 18 grams, for example.

The present invention allows for conveyance of lightweight articles at high speeds in a stable, reliable, and consistent manner. For example, the speed of the automatic rotary apparatus may be timed and synchronized to upstream operations, such as to accommodate the output from blow molding operations. As used in this document, "high speed" is intended to denote transport that operates significantly faster than traditional rotary conveyance systems. It will be appreciated by one of ordinary skill in the art, however, that the speed of transport may vary depending on the size, shape, design, and nature of bottles, the capacity and diameter of the carriage ring, the speed of rotation, the speeds and capabilities of the intake and off-take operations, and the like.

In addition, although increased speeds are desired, the rotary transfer apparatus needs to be operated in a stable manner. In other words, the bottles need to be controlled and positioned consistently in order to minimize the likelihood of jams or stoppages to the operations. The present invention allows for transport of the bottles at increased speeds with synchronized movement to and from the rotary transfer apparatus. A high number of bottles per revolution provides for increased speed and increased efficiency of the operations.

Figure 5:
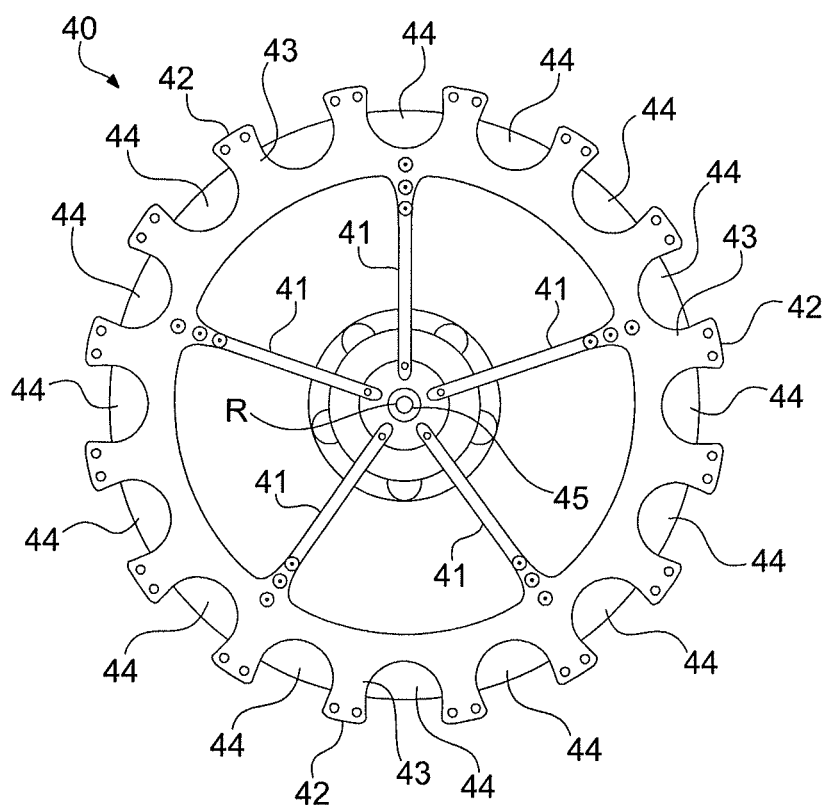
FIG. 5 shows a front view of one embodiment of a carriage ring for use with the automatic rotary transport apparatus.
Figure 7:
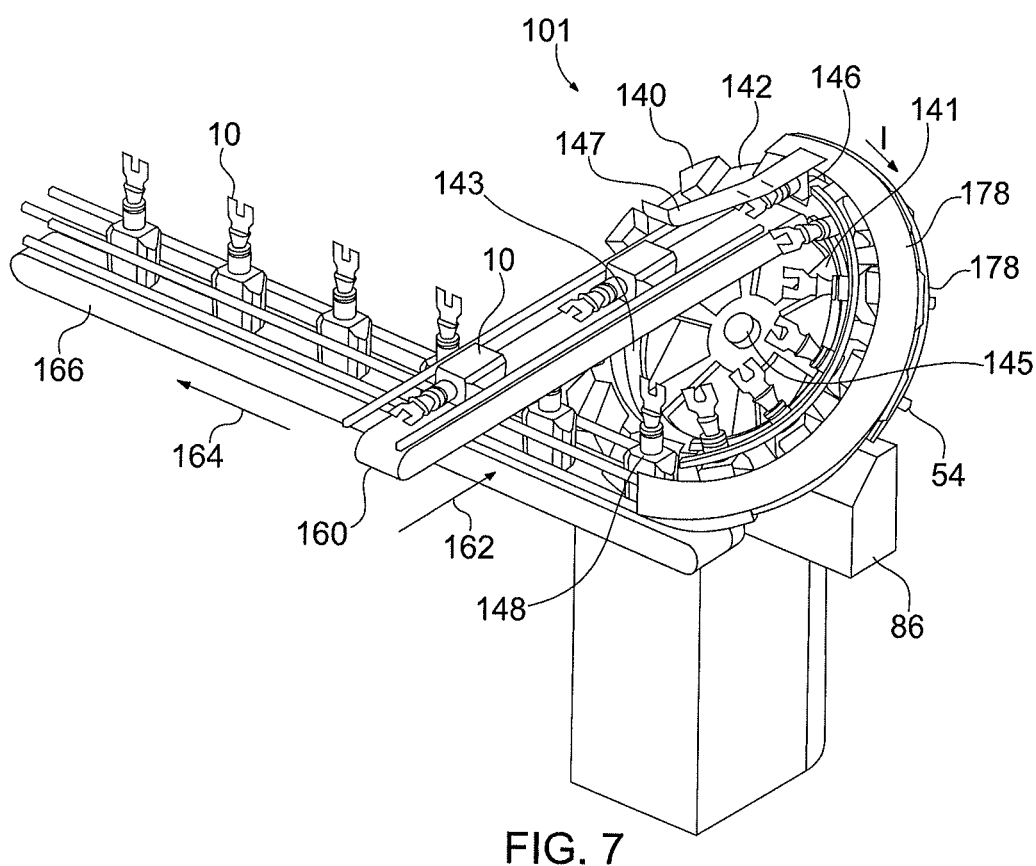
FIG. 7 shows a perspective view of another automatic rotary transport apparatus according to a different embodiment of the present invention.

Referring now to the drawing, in which like reference numbers refer to like elements throughout the various figures that comprise the drawing, FIG. 1 provides for one type of automatic rotary transport apparatus 1 for changing a traveling direction of a plurality of articles 10. FIG. 7 depicts another type of automatic rotary transport apparatus 101 for changing the traveling direction of the articles 10. The rotary transport apparatus 1, 101 includes a carriage ring 40, 140 having an outer perimeter 42, 142 defining a plurality of cavities 44, 144, which are spaced along the outer perimeter 42, 142. Sixteen cavities 44 are illustrated in FIG. 5; as would be appreciated by an artisan, the carriage ring 40, 140 can have more or fewer than sixteen cavities 44, 144 depending upon the application. Each cavity 44, 144 is adapted to receive a single article 10. One of the primary functions of the space-saving, automatic, rotary transfer apparatus 1, 101 is optimizing the flow of the articles 10 by changing the traveling direction of the plurality of articles 10.

Each article 10 enters the carriage ring 40, 140 traveling in a first direction 62, 162. The articles 10 may be traveling continuously or in a continuous stream, for example, on a conveyor 60, 160, from an upstream operation, such as a blow molding process known to one of ordinary skill in the art. The upstream operation may include blow molding hollow bottles 10a, 10b or other similar containers. In particular, plastic blow molded bottles 10a, 10b may be discharged from blow molds (not shown) onto a takeaway conveyance apparatus, such as conveyor 60, 160, and transported to the location of the automatic rotary transport apparatus 1, 101. As the bottles 10a, 10b are discharged from the blow molds, the conveyor 60, 160 may transfer the bottles 10a, 10b, one after the other, in a uniform single-file line or continuous stream of bottles, for example, at a constant speed.

The articles 10 may be conveyed to and from the automatic rotary transport apparatus 1, 101, for example, using a conveyor 60, 160, such as a cleated conveyor, a flat belt conveyor, fan belt conveyor, or similar endless conveyance apparatus. Although bottles 10a, 10b are exemplified in this document, it is envisioned that the automatic rotary transport apparatus 1, 101 can be used with any discrete articles 10 having any size, shape, and dimension including containers, vessels, flasks, vials, or the like known in the art.

Figure 2:
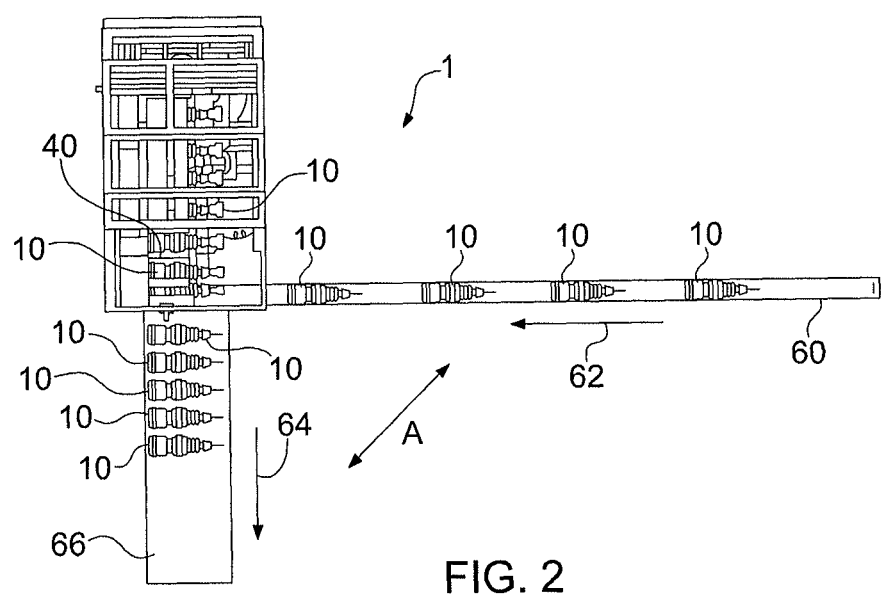
FIG. 2 shows a top view of an automatic rotary transport apparatus where the bottles are entering the apparatus in a first direction and the bottles are exiting the apparatus in a second direction, which is 90° relative to the first direction.
Figure 10:
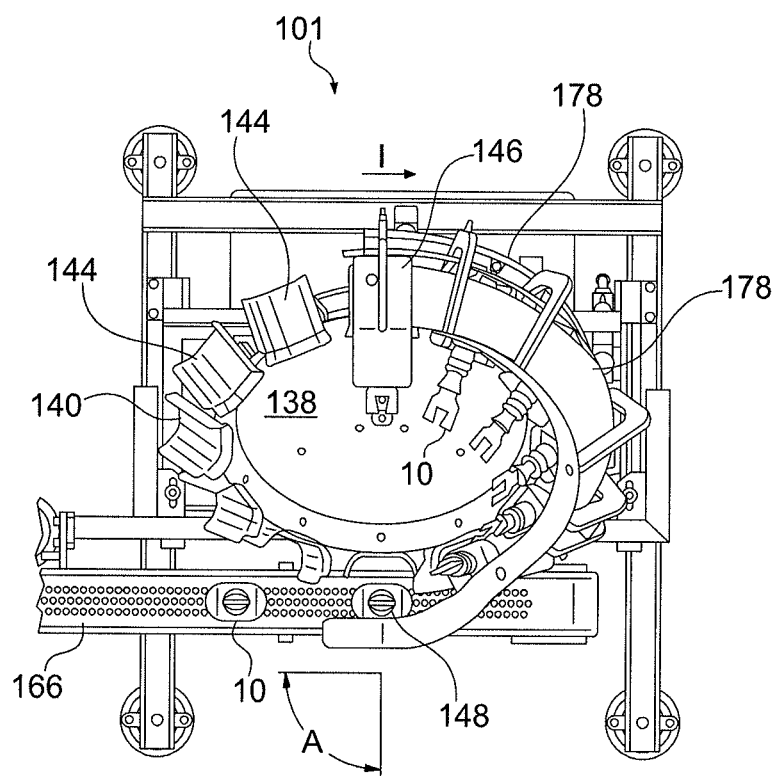
FIG. 10 shows a top view of the automatic rotary transport apparatus shown in FIG. 7.

Each article 10 enters the carriage ring 40, 140 traveling in the first direction 62, 162 and each article 10 leaves the carriage ring 40, 140 traveling in a second direction 64, 164, which is different from the first direction 62, 162. As best shown in FIGS. 2 and 10, the second traveling direction 64, 164 (exiting the carriage ring 40, 140) may be oriented at an angle A relative to the first traveling direction 62, 162 of the articles 10 entering the carriage ring 40, 140. The angle A may be, for example, about 90°. The first traveling direction 62, 162 and the second traveling direction 64, 164 may or may not be on the same plane (e.g., a horizontal plane). The articles 10 may be conveyed from the automatic rotary transport apparatus 1, 101, for example, using a conveyor 66, 166. In addition or in the alternative, as shown in FIG. 1, the articles 10 may leave the automatic rotary transport apparatus 1 via a chute 90. The chute 90 may deposit the articles 10 on the conveyor 66, 166 or the articles 10 may be transported in any known fashion.

The articles 10 may be traveling continuously in the first direction 62, 162 and the second direction 64, 164. For example, as depicted in FIGS. 1 and 7, the articles 10 may be traveling on the flat conveyor 60, 160, and the articles 10 may be aligned and organized length-to-length (with or without space or gaps between the articles 10) before entering the carriage ring 40, 140. In particular, gaps may be introduced between the articles 10 due to inconsistencies in the blow molding process. The articles 10 may need to be reoriented and, optionally, repositioned to remove the gaps or spaces between the articles 10 in order to proceed to downstream operations, such as de-flashing, trimming, packaging, and the like. In particular, the bottles 10a, 10b may need to be organized side-by-side in order for downstream cutting or trimming operations. Due to the mechanism of the rotary transport apparatus 1, 101, the articles 10 may be organized side-by-side and, if desired, with minimal space between the articles 10, in the second traveling direction 64, 164 after leaving the carriage ring 40, 140.

The carriage ring 40, 140 may be in the form of a cylindrical drum, ring, disc, or the like. The carriage ring 40, 140 may be comprised of any suitable support structure or framework to form a circular carrousel where the articles 10 are housed in or near the periphery of the carriage ring 40, 140. FIG. 5 depicts one embodiment of the carriage ring 40 with five spokes 41 supporting an outer ring structure 43. FIG. 7 depicts an alternative embodiment of carriage ring 140 with six spokes 141 supporting an outer ring structure 143. The center 45, 145 of the carriage ring 40, 140 includes a shaft, cam, or the like in order to provide for a central axis of rotation R, where the carriage ring 40, 140 rotates about this central point. The carriage ring 40, 140 may be hollow or filled or may comprise any suitable structure known in the art.

Figure 8:
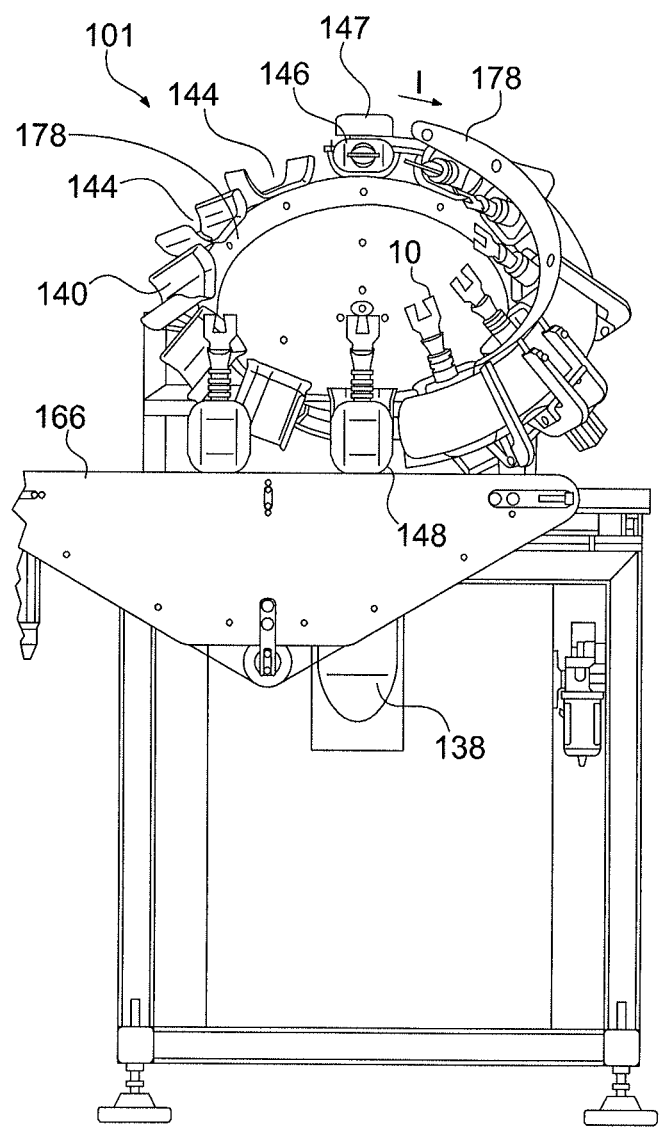
FIG. 8 shows a front view of the automatic rotary transport apparatus shown in FIG. 7.

The cavities 44, 144 may be defined in the carriage ring 40, 140 (e.g., recessed into the cylindrical drum) or may be comprised of separate structures attached to or affixed to the carriage ring 40, 140, for example. As depicted in FIG. 5, the cavities 44 may be recessed into and around the outer perimeter 42 of the carriage ring 40. In an alternative embodiment shown in FIG. 8, the cavities 144 may be formed by U-shaped members attached to the carriage ring 140. The cavities 44, 144 may be of any suitable shape and dimension, but are preferably sized and shaped to accommodate the articles 10 to be transported. In the case of bottles 10a, 10b and depending on their shape and dimensions, the cavities 44, 144 may be substantially U-shaped, for example, as depicted in FIG. 5. Preferably, each cavity 44, 144 is configured and sized to receive a single individual article 10, such as the single bottle 10a, 10b. Each cavity 44, 144 may be sized and dimensioned based on the overall dimensions (e.g., outer radius) and shape of the bottle 10a, 10b.

The carriage ring 40, 140 may include twelve or more, preferably fourteen or more, and most preferably sixteen or more cavities 44, 144 spaced around the outer perimeter 42, 142 depending on the outer diameter of the carriage ring 40, 140. Preferably, the cavities 44, 144 are equally spaced around the outer perimeter 42, 142 of the carriage ring 40, 140 in order to provide for optimal capacity for transport. The size of the carriage ring 40, 140 as well as the number and spacing of the cavities 44, 144 may be selected in order to provide the desired throughput (e.g., articles 10 per minute), speed (e.g., up to 9 rpm), capacity, and the like based on the type and size of the articles 10, the upstream operation and downstream operation requirements or capabilities, and any requirements for additional functionality included in the rotary transport apparatus 1, 101, such as trimming capabilities. For example, the speed of rotation of the carriage ring 40, 140 may be decreased, but the overall speed of transfer may be increased by providing more cavities 44, 144 around the carriage ring 40, 140 and ensuring that the cavities 44, 144 are 100% occupied. In other words, a high or increased overall speed (e.g., higher bottles per revolution) may be obtained by increasing the number of cavities 44, 144 and filling unoccupied cavities 44, 144 even though a decrease in revolution speed may be provided for control purposes and to retain the articles 10 for a given period of time (e.g., for additional functionality).

The speed of the transfer operation may be optimized and synchronized to upstream operations, downstream operations, or both. In particular, the overall speed of bottles per revolution may be synchronized to the stream of bottles 10a, 10b produced in upstream blow molding processes. For example, the carriage ring 40, 140 may be operated stably at a speed of greater than about 120 cycles per minute or about 160 cycles per minute to about 200 cycles per minute. For example, the carriage ring 40, 140 may convey about 2-3 bottles per second from the first position 46, 146 to the second position 48, 148 (e.g., from the entrance to the exit) of the carriage ring 40, 140 in a single rotation.

Figure 14:
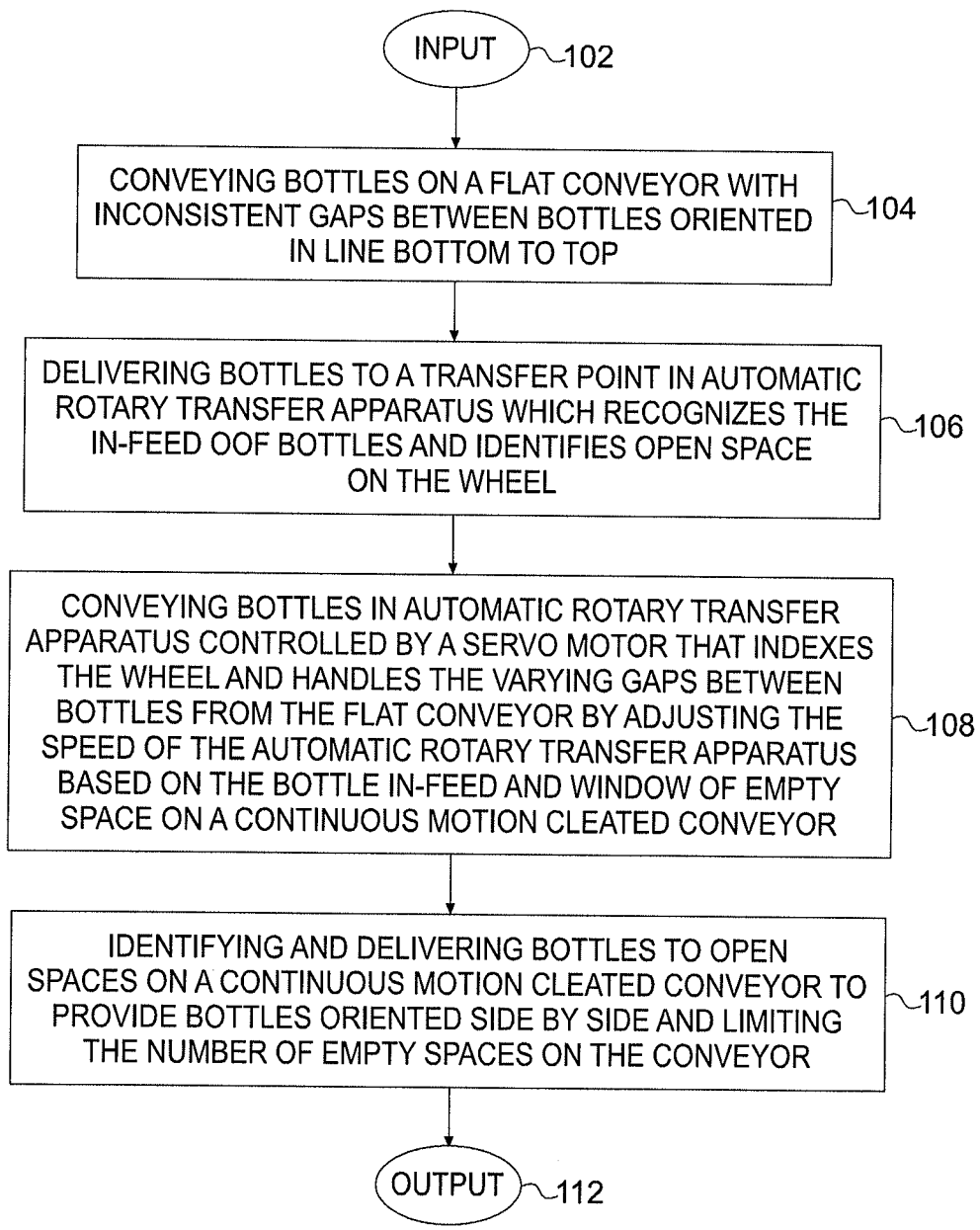
FIG. 14 is a flow chart demonstrating an algorithm suitable for use with the present invention.

According to one embodiment of the present invention, FIG. 14 depicts a flow chart representing the steps between the input 102 and the output 112 for the automatic rotary transfer apparatus 1, 101. In a first conveying step 104, the bottles 10a, 10b are conveyed on a flat conveyor 60, 160 with inconsistent gaps between the bottles 10a, 10b oriented in a line bottom to top. Next, in a delivering step 106, the bottles 10a, 10b are delivered to a transfer point in the automatic rotary transfer apparatus 1, 101 which recognizes the in-feed of bottles 10a, 10b and identifies open cavities 44, 144 on the carriage ring 40, 140. The bottles 10a, 10b are then conveyed, in a step 108, in the automatic rotary transfer apparatus 1, 101. The automatic rotary transfer apparatus 1, 101 is controlled by a servo motor that indexes the carriage ring 40, 140 and handles the varying gaps between bottles 10a, 10b from the flat conveyor 60, 160 by adjusting the speed of the automatic rotary transfer apparatus 1, 101 based on the rate of bottle in-feed and window of empty space on the continuous motion cleated conveyor 66, 166. Next, in a delivery step 110, open spaces are identified and the bottles 10a, 10b are delivered to the open spaces on the continuous motion cleated conveyor 66, 166 to provide bottles 10a, 10b oriented side-by-side and limiting the number of empty spaces on the conveyor 66, 166. In other words, the automatic rotary transfer apparatus 1, 101 needs to recognize the in-feed of bottles 10a, 10b, shuttle the bottles 10a, 10b to open cavities 44, 144, look for open space on the cleated conveyor 66, 166, deposit the bottles 10a, 10b into empty spaces, and adjust the speed of rotation based on the bottle in-feed and window of empty space on the cleated conveyor 66, 166.

In addition, the conveyance of the articles 10 can be timed and controlled such that the articles 10 avoid direct contact with one another. Direct contact between the bottles 10a, 10b may be detrimental to the condition of the bottles 10a, 10b. For example, bottles 10a, 10b produced through a blow molding operation may not be fully set or hardened during transport and contact with adjacent bottles 10a, 10b may cause damage or sticking between the bottles 10a, 10b. Thus, the rotary transfer apparatus 1, 101 may be configured and timed such that the plurality of articles 10 are separated a distance from one another during rotation and once discharged from the carriage ring 40, 140.

The articles 10 may be guided into open, unfilled, or unoccupied cavities 44, 144 in the carriage ring 40, 140 at a first entry position 46, 146. The articles 10 may be guided into an unoccupied cavity 44, 144 by the speed of the conveyor 60, 160 in the first traveling direction 62, 162. In addition, one or more air jets (not shown), for example, using compressed air, may be used to guide each article 10 into an open cavity 44, 144. A mechanical rail or guide (e.g., a flexible or rigid member) may also be used to direct the article 10 into the open cavity 44, 144. FIG. 7 depicts a suitable type of guide 147. Each article 10 enters the carriage ring 40, 140 at the same first entry position 46, 146. Once the article 10 has entered the cavity 44, 144 at position 46, 146, one or more vacuum devices may be provided to hold and secure the article 10 in the cavity 44, 144. For example, one or more suction chambers 34 may be positioned proximate the bottom 26 of the bottle 10a, 10b to hold the bottle 10a, 10b in place.

One or more sensors 80 (e.g., cameras, photoelectric sensors, photo eye sensors, etc.) may also be provided for determining if the cavity 44, 144 is fully and completely occupied by the article 10. Once the cavity 44, 144 at entry position 46, 146 is occupied by the article 10, the carriage ring 40, 140 may rotate and index to allow the next article 10 from conveyor 60, 160 to enter the next open cavity 44, 144 in the carriage ring 40, 140 at the entry position 46, 146. It is possible that the cavity 44, 144 may not be occupied by the article 10 and the carriage ring 40, 140 may rotate with one or more vacant cavities 44, 144. For example, the carriage ring 40, 140 may automatically rotate on a timer with or without filling the cavity 44, 144.

The rotating and indexing function I can move the carriage ring 40, 140 intermittently or continuously in a clockwise or counter-clockwise manner about the central axis of rotation R. Preferably, the carriage ring 40, 140 rotates intermittently in a clockwise fashion. The rotating and indexing function I may be intermittent in that the carriage ring 40, 140 rotates after an article 10 fills the cavity 44, 144. For example, the carriage ring 40, 140 may only rotate and index if one or more sensors 80 automatically determine that the cavity 44, 144 is fully occupied by the article 10 at entry position 46, 146 or the carriage ring 40, 140 may rotate at set intervals. In an exemplary embodiment, the cavities 44, 144 are 100% filled during each rotation of the carriage ring 40, 140.

In order to operate the automatic rotary transport apparatus 1, 101, the automatic rotary transport apparatus 1, 101 may include an automatic drive assembly 38, 138 to index and rotate the carriage ring 40, 140 about the central axis of rotation R. The drive assembly 38, 138 may include a motor, such as a servo motor or torque motor, and any suitable equipment known in the art, which drives and rotates (e.g., directly) the carriage ring 40, 140. For example, the carriage ring 40, 140 may be driven by a shaft or cam to make a rotational movement about the central axis of rotation R (which extends perpendicular to the plane of FIG. 5). The drive assembly 38, 138 may also include any suitable control apparatus or software needed to operate the equipment.

Another function of the automatic rotary transfer apparatus 1, 101 is the ability to change the orientation of the articles 10 when the articles 10 leave the automatic rotary transfer apparatus 1, 101. For example, each article 10 may leave the carriage ring 40, 140 at a second exit position 48, 148. In other words, the articles 10 may be unloaded from the carriage ring 40, 140 in a specific and reliable manner for downstream operations. Each article 10 enters the carriage ring 40, 140 (e.g., at entry position 46, 146) in a first orientation and each article 10 leaves the carriage ring 40, 140 (e.g., at exit position 48, 148) in a second orientation. The first and second orientations may be the same or different. In particular, the articles 10 may be oriented horizontally when entering the carriage ring 40, 140 in the first direction 62, 162. The articles 10 may then be oriented horizontally or vertically when exiting the carriage ring 40, 140 in the second direction 64, 164.

Figure 9:
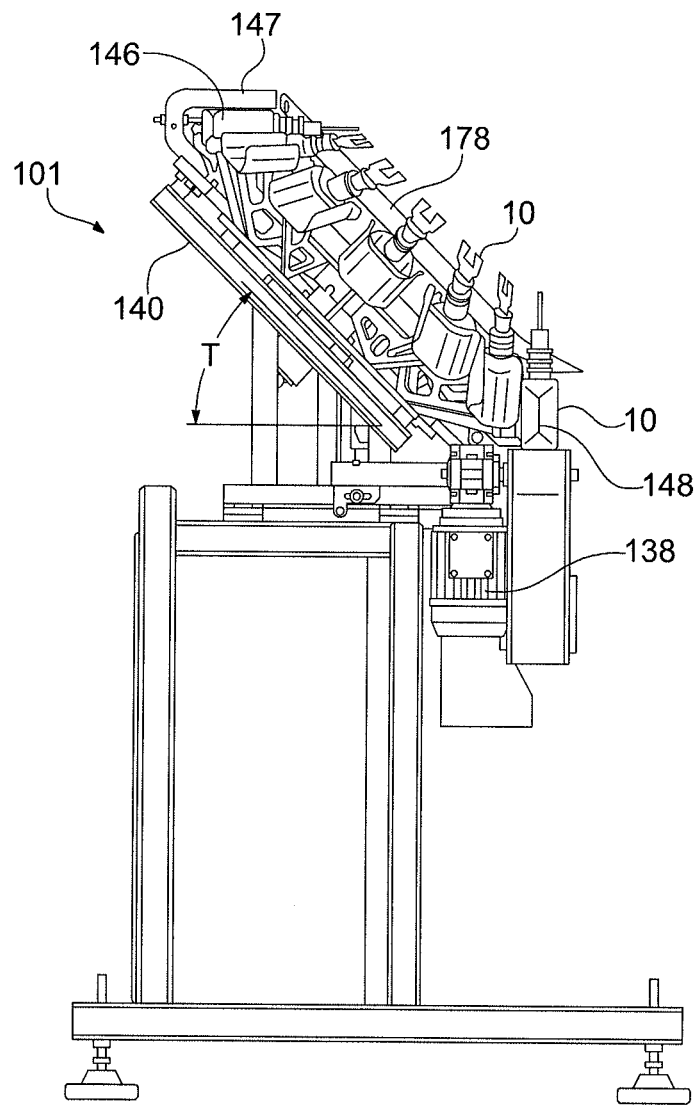
FIG. 9 shows a side view of the automatic rotary transport apparatus shown in FIG. 7.

As shown in FIGS. 1 and 2, one embodiment of the carriage ring 40 is oriented substantially vertically to allow the articles 10 to be oriented horizontally in the first traveling direction 62 as well as the second traveling direction 64. In an alternative embodiment of the automatic rotary transfer apparatus 101 depicted in FIG. 7, the articles 10 may be oriented horizontally in the first traveling direction 162 before entering the carriage ring 140 and oriented vertically in the second traveling direction 164 after leaving the carriage ring 140. In other words, the articles 10 may enter the carriage ring 140 on their sides and exit the carriage ring 140 standing upright. In order to rotate the orientation of the articles 10 from horizontal to vertical, the carriage ring 140 may be oriented at a tilt angle T of about 30°-60°, preferably about 40°-50°, and most preferably about 45° relative to horizontal, as shown in FIG. 9. In other words, the central axis of rotation R is provided at tilt angle T (e.g., about 45° relative to horizontal).

For articles 10 changing from a horizontal orientation to a vertical orientation, each of the plurality of articles 10 may enter into the open cavity 144 in the first position 146 at about a 12 o'clock position and may exit the cavity 144 in the second position 148 at about a 6 o'clock position when the carriage ring 140 rotates in a clockwise manner. For articles 10 maintaining a horizontal orientation from the first direction 62 to the second direction 64 but changing from a length-to-length to a side-by-side configuration, each of the plurality of articles 10 may enter into the open cavity 44 in the first position 46 at about a 9 o'clock position and may exit the cavity 44 in the second position 48 after about a 6 o'clock position but before the 9 o'clock position when the carriage ring 40 rotates in a clockwise manner. Thus, each article 10 enters the first position 46, 146 at the same location on the carriage ring 40, 140.

Instead of having to use separate and additional downstream devices, the automatic rotary transfer apparatus 1, 101 may incorporate additional functionality, such as de-flashing, trimming, and the like, in order to shorten the line and remove costly downstream devices. In addition, due to the size and configuration of the cavities 44, 144 and the controlled speed of rotation, the articles 10 may be retained or held captive in the carriage ring 40, 140 for a longer period of time, which allows for the incorporation of additional functionality in a single rotation of the carriage ring 40, 140.

Figure 11A:
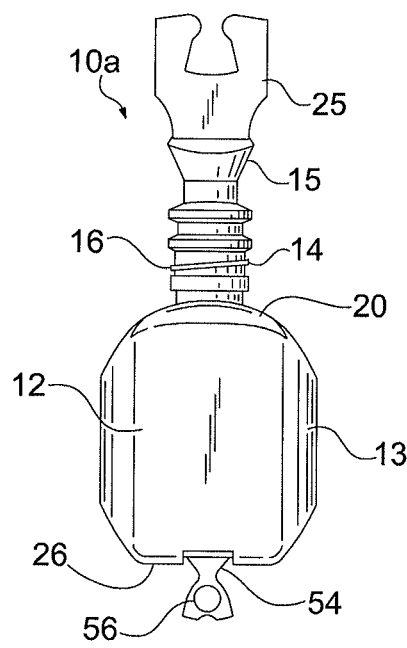
FIG. 11A shows a front view of one type of bottle suitable for use with the automatic rotary transport apparatus of the present invention.
Figure 11B:
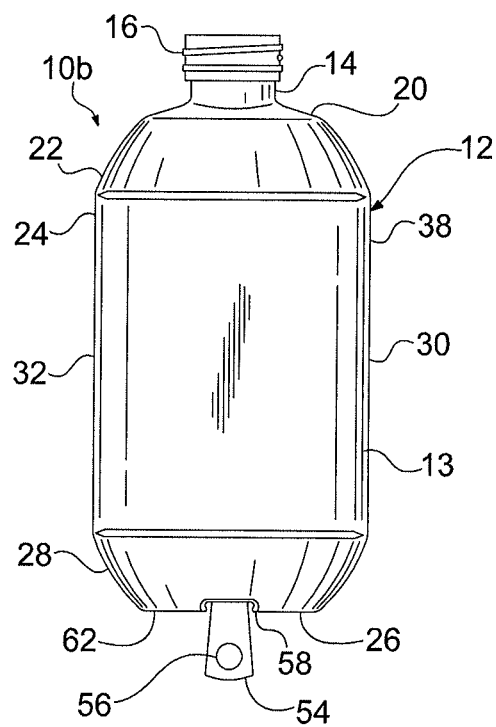
FIG. 11B a front view of another type of bottle suitable for use with the automatic rotary transport apparatus of the present invention.

In particular, the automatic rotary transfer apparatus 1, 101 may include other functionality, such as cutting or separating the articles 10 or removing waste from the articles 10 remaining from the manufacturing process. For example, when the bottle 10a, 10b is formed by a blow molding process, excess blow molding material or waste may remain affixed to or on the surface of the bottle 10a, 10b. FIGS. 11A and 11B depict two types of bottles 10a, 10b that may be produced through blow molding. For example, bottles 10a, 10b may be manufactured by extruding a parison of plastic material, capturing a portion of the parison within a mold, and inflating the portion of the parison that is within the mold against the walls of the mold to fabricate the specific shape of the container desired. The bottle 10a, 10b may be designed to be rigid or collapsible. Although bottles 10a, 10b are exemplified in this document, it is envisioned that any type of bottle (e.g., cylindrical) having any size and dimensions known in the art may be produced. Also, any suitable types of manufacturing processes including other types of molding processes could be used to produce the articles 10.

The bottle 10a, 10b may include a main body portion 12 having a sidewall 13 that defines an interior space having a given volume. The bottle 10a, 10b may further include a neck portion 14 that may have at least one external thread 16 for receiving a closure or a coupling. An opening may be defined in the neck portion 14 and may be in communication with the interior space of the bottle 10a, 10b. Depending on the design, the bottle 10a, 10b may include a tapered upper transition portion 22, an intermediate portion 24, and a tapered bottom transition portion 28. The main body portion 12, and specifically the intermediate portion 24, has a first side 30 and a second side 32. The tapered upper transition portion 22 may include an upper surface 20 that is unitary with the neck portion 14 and with the sidewall 13 of the main body portion 12. The bottle 10a, 10b may include a bottom surface 26.

Figure 12:
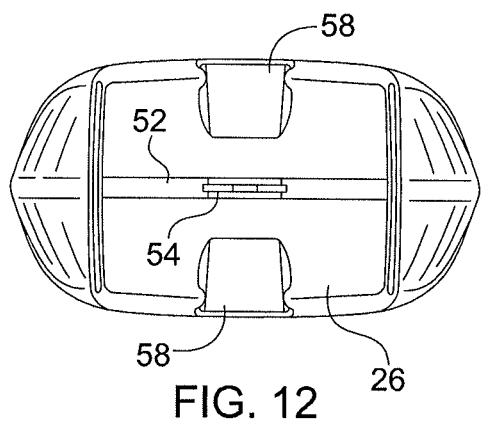
FIG. 12 shows a bottom view of the bottle shown in FIG. 11B.

The bottle 10a, 10b may be provided with a mechanism for hanging the bottle 10a, 10b. For example, a hanging hook 54 may be attached to the bottom surface 26. A hole 56 may be defined in the hanging hook 54. In the alternative, a hook-shaped projection could be used instead of the hole 56. The hanging hook 54 may be integrally molded with a central rib 52 that is defined in the bottom surface 26 of the bottle 10a, 10b. A pair of locking channels 58, shown in FIG. 12, may also be molded into the bottom surface 26 in order to receive and releasably secure the hanging hook 54 in a non-deployed position 55b.

In addition, excess material or waste may be affixed to the formed bottle 10a, 10b. For example, a tail 25 from the next bottle 10a, 10b in production may remain on the top or bottom areas of the bottle 10a, 10b. In addition, a dome 15 may remain above the neck portion 14 of the bottle 10a, 10b. In some cases, two or more bottles 10a, 10b may be joined together, for example, where each bottle 10a, 10b is attached to the other at the neck portion 14, and the bottles 10a, 10b need to be separated from one another (not shown). Thus, the bottles 10a, 10b may need to undergo a de-flashing, trimming, cutting, or separating process, for example, to trim the tail 25, remove the dome 15, and the like. As will be recognized by one of ordinary skill in the art, the weight of the bottle 10a, 10b may vary depending on the type and amount of scrap or waste material adhered to the bottle 10a, 10b.

In particular, the rotary transfer apparatus 1, 101 may include a modification device to modify the plurality of articles 10. The modification device may include, for example, a de-flasher or trimmer 70 for separating articles 10 or cutting waste or scrap material from the articles 10. The trimmer 70 may be used, for example, to trim the tail 25 from the bottle 10a, 10b.

Figure 6:
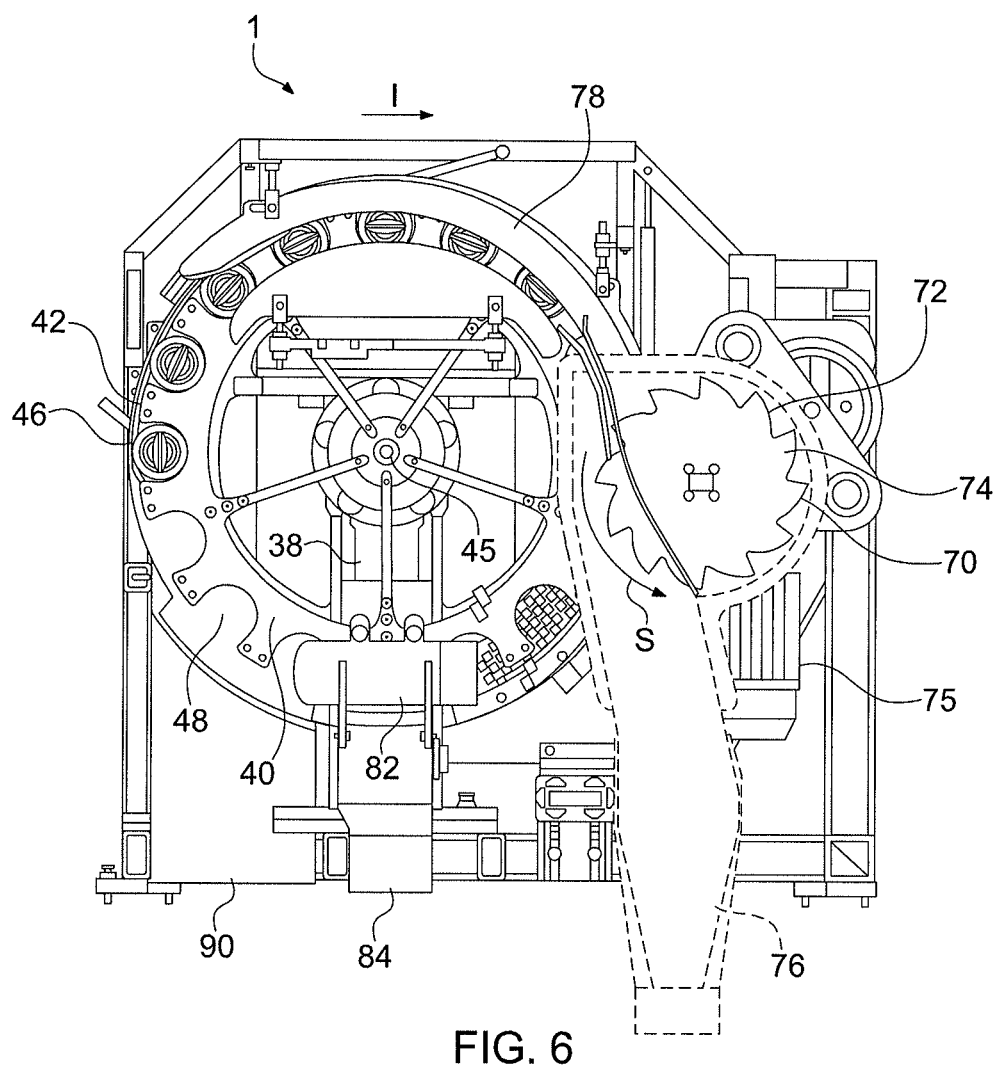
FIG. 6 shows a front view of the automatic rotary transport apparatus shown in FIG. 1.

The de-flasher or trimmer 70 may include any suitable type and configuration of equipment suitable for cutting or trimming the articles 10. For example, the trimmer 70 may include a cutting disc 72 (e.g., metal cutting disc) having a plurality of teeth 74. As shown in FIG. 6, the cutting disc 72 may spin in a direction S opposite to the indexing I of the carriage ring 40 to cut and remove the tail 25. The trimmer 70 may be operated using an automatic drive assembly 75 to spin the cutting disc 72. The drive assembly 75 may include a motor, such as a servo motor or torque motor, and any suitable equipment known in the art, which drives and rotates (e.g., directly) the cutting disc 72. The drive assembly 75 may also include any suitable control apparatus or software needed to operate the equipment. The trim waste may exit the rotary transfer apparatus 1 via a chute 76, for example. One or more guides or rails 78, 178 (e.g., top and bottom rails) may also be provided to maintain the stability and position of the articles 10 through the trimmer 70 to ensure accurate and quality cuts.

The automatic rotary transfer apparatus 1, 101 may include additional functionality, such as an inspection station for monitoring and inspecting the quality of the articles 10. The automatic rotary transfer apparatus 1, 101 can automatically remove articles 10 which do not pass certain quality standards. For example, one or more sensors 80 may be used to inspect the quality of the articles 10 including the quality of the central rib 52 on the bottom surface 26 of the bottle 10a, 10b and the quality of the trimming or cutting operation. A suction chamber 34 may also be used to hold the article 10 in position after trimming for the sensor 80 to check the accuracy of the trim. The sensors 80 may include cameras, photoelectric sensors, photo eye sensors, or other sensors known for automation. If articles 10 are damaged or imperfect in any way, the damage or imperfect articles 10 are automatically discharged from the carriage ring 40 at a discharge area. The discharge area may include a moveable gate 82 (e.g., a slide gate) adapted to open and allow the damaged or imperfect articles 10 to exit through, for example, a chute 84 to a waste collection area.

Figure 13:
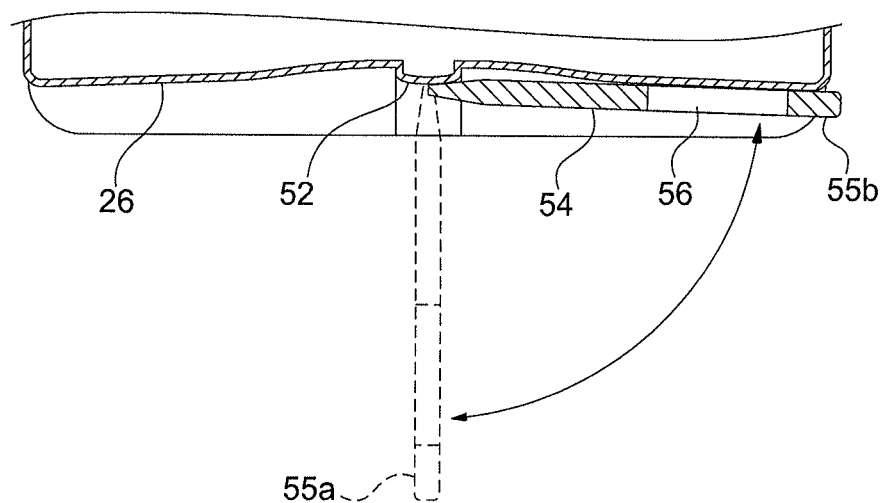
FIG. 13 shows a side view of the collapsible hook on the bottom of the bottle shown in FIG. 11B.

In the case of bottles 10a, 10b having a mechanism for hanging the bottle 10a, 10b, such as the hanging hook 54 attached to the bottom surface 26, a hook closing station 86 may be provided for bending or maneuvering the hanging hook 54 into the non-deployed position 55b (e.g., recessed into one of the locking channels 58). As best seen in FIG. 13, the bottle 10a, 10b may be produced with the hanging hook 54 in an extended or deployed position 55a. In order to meet the demands of downstream processing and to orient the bottles 10a, 10b in an upright and vertical orientation, the hanging hook 54 can be bent or moved to the non-deployed position 55b. The hook closing station 86 can include any suitable equipment and controls known in the art for folding such a feature.

Figure 3:
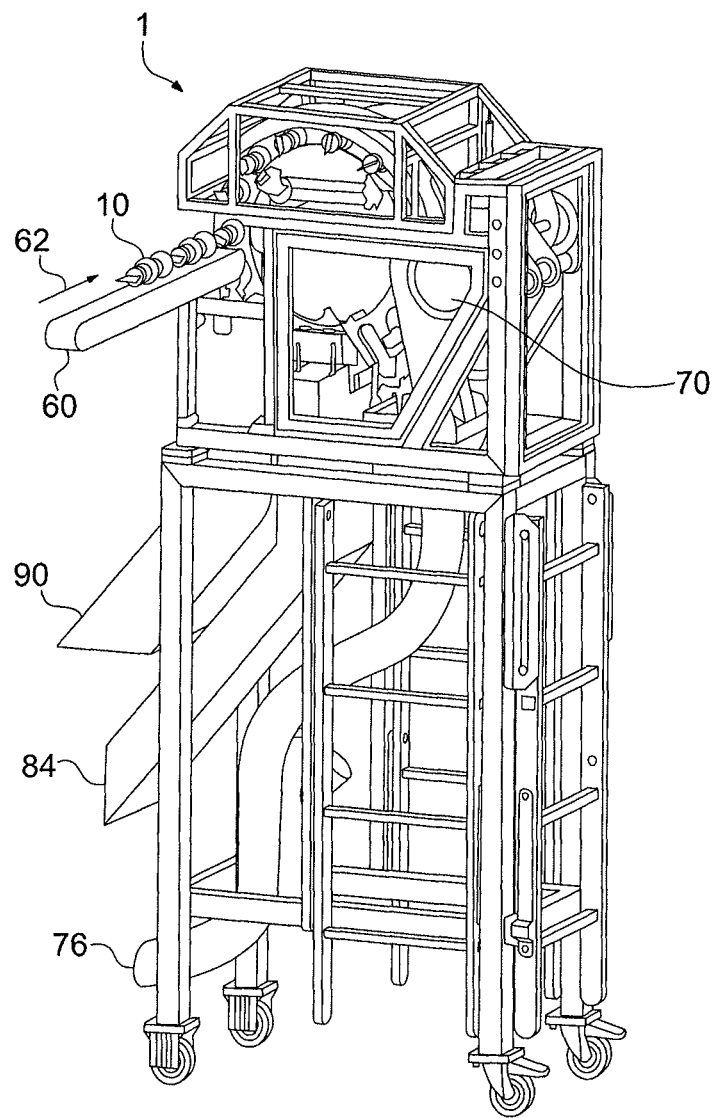
FIG. 3 shows a perspective view of a mobile unit and docking station suitable for use with the automatic rotary transport apparatus shown in FIG. 1.
Figure 4:
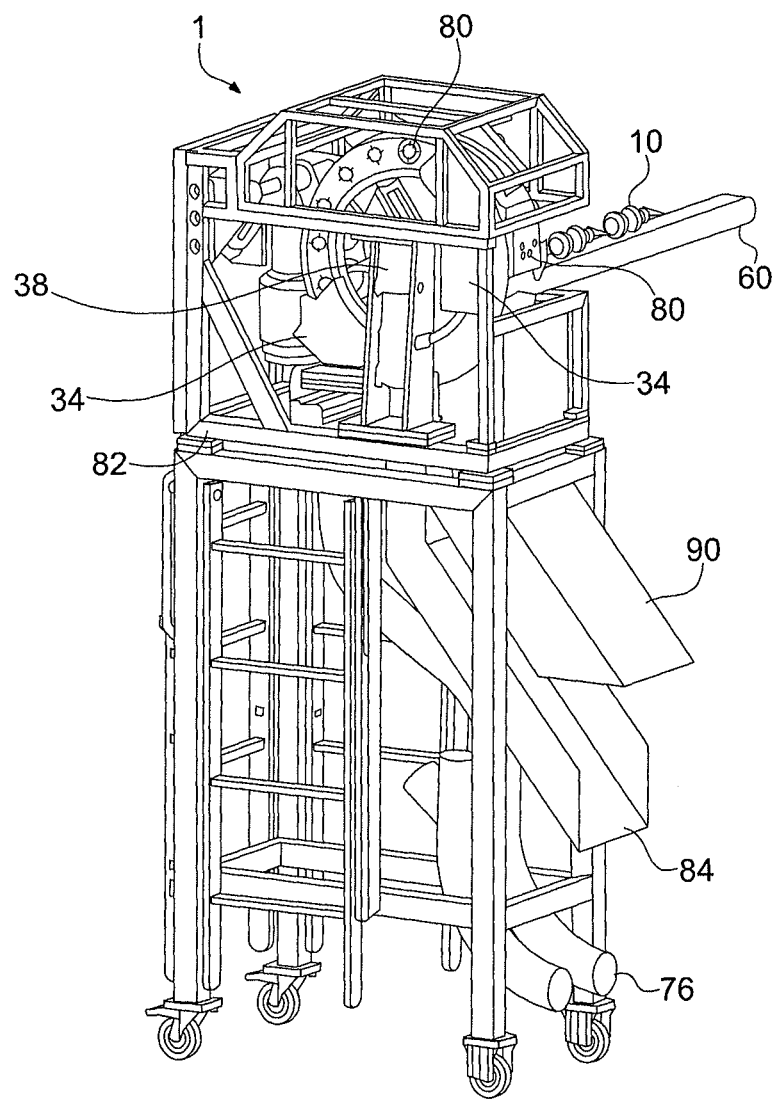
FIG. 4 shows a back view of the mobile unit and docking station shown in FIG. 3.

As depicted in FIGS. 3 and 4, the automatic rotary transport apparatus 1, 101 may be provided as part of a mobile unit with a docking station. The mobile unit allows the automatic rotary transport apparatus 1, 101 to be portable for use in different areas of a manufacturing space. The rotary transport apparatus 1, 101 may also be raised to allow for gravity-based chutes 76, 84, and 90, for example.

In another embodiment of the present invention, a method for changing a traveling direction, an orientation, or both of a plurality of articles 10 may include:

(a) conveying in the first direction 62, 162 the plurality of articles 10 in the first orientation;

(b) introducing each of the plurality of articles 10 into one of a plurality of cavities 44, 144 at the first position 46, 146 along the perimeter 42, 142 of the carriage ring 40, 140;

(c) rotating and indexing the carriage ring 40, 140 about the central axis of rotation R; and (d) removing each of the plurality of articles 10 in the second orientation from the carriage ring 40, 140 at the second position 48, 148 along the perimeter 42, 142 of the carriage ring 40, 140 where the plurality of articles 10 are traveling in the second direction 64, 164, which is different from the first direction 62, 162.

The rotary transfer apparatus 1, 101 of the present invention is able to provide a number of desired functions including: (1) optimizing the flow of the articles 10 by changing the traveling direction of the articles 10; (2) changing the orientation of the articles 10; (3) cutting or separating the articles 10 or removing waste or trim from the articles 10; (4) monitoring and inspecting the quality of the articles 10; (5) automatically removing articles 10 which do not pass quality standards; and (6) unloading the quality articles 10 in a specific and reliable manner.

As an added advantage, the space-saving, high efficiency rotary transfer apparatus 1, 101 can provide a triage function, which automatically separates the output into good articles 10 (e.g., chute 90) in a desired configuration and orientation, discharges bad articles 10 (e.g., chute 84), and removes waste trim or scrap (e.g., chute 76). In addition, one or more rotary transfer apparatus 1, 101 in accordance with the present invention may be used in series or parallel to achieve the desired outcomes. For example, two rotary transfer apparatus 1, 101 may be used in parallel to accommodate a dual parison blow molding device.

Although illustrated and described above with reference to certain specific embodiments and examples, the present invention is nevertheless not intended to be limited to the details shown. Rather, various modifications may be made in the details within the scope and range of equivalents of the claims and without departing from the spirit of the invention. It is expressly intended, for example, that all ranges broadly recited in this document include within their scope all narrower ranges which fall within the broader ranges. In addition, features of one embodiment may be incorporated into another embodiment.

What is claimed is:

1. An automatic rotary transfer apparatus for conveying a plurality of lightweight articles at a high speed comprising:
    a carriage ring having an outer perimeter defining a plurality of cavities spaced along the outer perimeter with each cavity adapted to receive a single lightweight article of the plurality of lightweight articles, the carriage ring adapted to rotate at a speed of rotation;
    a vacuum device adapted to hold the single lightweight article in the respective cavity;
    at least one sensor to determine if the cavity is occupied by the single lightweight article or is open; and
    a drive assembly to index and rotate the carriage ring about a central axis of rotation, synchronized to a continuous stream of a plurality of the articles from an upstream operation, and to adjust the speed of rotation of the carriage ring based on the continuous stream of the plurality of articles, the open cavities identified on the carriage ring, and empty space on an output conveyor,
    wherein the carriage ring is adapted to receive each of the plurality of lightweight articles at a first position and in a first orientation traveling in a first direction and the carriage ring is adapted to discharge each article at a second position and in a second orientation traveling in a second direction different from the first direction,
    wherein the first position, first orientation, first direction, second position, second orientation, and second direction are the same for each of the plurality of lightweight articles, and wherein the first direction and the second direction are not in the same plane.

2. The apparatus of claim 1, wherein the carriage ring is stable at a speed of about 160 cycles per minute to about 200 cycles per minute.

3. The apparatus of claim 1, wherein the carriage ring conveys about 2-3 articles per second from the first position to the second position.

4. The apparatus of claim 1, wherein the plurality of articles are empty bottles.

5. The apparatus of claim 4, wherein the empty bottles weigh about 8 grams to about 35 grams.

6. The apparatus of claim 1, wherein the continuous stream of the plurality of articles is produced from an upstream blow molding operation.

7. The apparatus of claim 1, wherein the plurality of articles are separated a distance from one another to avoid direct contact between the plurality of articles.

8. The apparatus of claim 1 further comprising a device to perform at least one additional function in a single rotation of the carriage ring selected from the group consisting of de-flasher, trimmer, inspector, separator, hook closer, and combinations thereof.

9. The apparatus of claim 1, wherein the second direction is oriented at about 90° relative to the first direction.

10. The apparatus of claim 1, wherein the carriage ring comprises 12 or more equally spaced substantially U-shaped cavities.

11. The apparatus of claim 1, wherein prior to entering the carriage ring, the articles are organized length-to-length and, after leaving the carriage ring, the articles are organized side-by-side.

12. The apparatus of claim 1, wherein the carriage ring is vertically oriented and the first orientation and the second orientation are horizontal.

13. The apparatus of claim 1, wherein the carriage ring is oriented at an angle of about 30°-60° relative to horizontal and the first orientation is horizontal and the second orientation is vertical.

14. The apparatus of claim 1 further comprising a conveyor to convey the plurality of articles in the first direction, and one or more air jets to guide each article into each cavity.

15. An automatic rotary transfer apparatus for conveying a plurality of lightweight articles at a high speed and performing at least one additional function in a single rotation, the apparatus comprising:
    a conveyor traveling in a first direction to move a plurality of articles in a continuous stream in a first orientation from an upstream operation, wherein the first orientation is the same for each of the plurality of articles;
    a carriage ring having an outer perimeter defining a plurality of cavities spaced along the outer perimeter with each cavity adapted to receive a single article of the plurality of articles from the conveyor, the carriage ring adapted to rotate at a speed of rotation;
    a drive assembly to index and rotate the carriage ring about a central axis of rotation, synchronized to the continuous stream of the plurality of articles from the upstream operation, and to adjust the speed of rotation of the carriage ring based on the continuous stream of the plurality of articles, open cavities identified on the carriage ring, and empty space on an output conveyor;
    an inspection station including a sensor to inspect the plurality of articles and a discharge area to discharge damaged or imperfect articles in a single rotation of the carriage ring;

a modification device to modify the plurality of articles during the single rotation of the carriage ring; and an unloading location to remove each article from the carriage ring, wherein the carriage ring is adapted to discharge each article in a second orientation traveling in a second direction different from the first direction, wherein the second orientation is the same for each of the plurality of articles, and wherein the first direction and the second direction are not in the same plane.

16. The apparatus according to claim 15, wherein the modification device includes a trimmer comprising a toothed metal cutting disc.

17. The apparatus according to claim 15, wherein the modification device includes a hook closing station.

18. The apparatus according to claim 15, wherein the discharge area includes a moveable gate adapted to open for the damaged or imperfect articles.

19. The apparatus according to claim 15, further comprising a second conveyor to convey the plurality of articles from the unloading location in the second direction.

20. A method for conveying a plurality of lightweight articles at a high speed comprising:

conveying in a first direction a plurality of articles in a continuous stream in a first orientation from an upstream operation, wherein the first orientation is the same for each of the plurality of articles;

introducing each of the plurality of articles into one of a plurality of cavities at a first position along a perimeter of a carriage ring and holding each article in each respective cavity in the carriage ring;

rotating and indexing the carriage ring about a central axis of rotation synchronized to the continuous stream of the plurality of articles from the upstream operation, wherein the carriage ring only rotates and indexes if a sensor determines the cavity is occupied by the article at the first position such that 100% of the cavities are occupied for each rotation; and removing each of the plurality of articles in a second orientation from the carriage ring at a second position along the perimeter of the carriage ring, wherein the plurality of articles are traveling in a second direction different from the first direction and the second orientation is the same for each of the plurality of articles, and wherein the first direction and the second direction are not in the same plane.

21. The method of claim 20, wherein when the carriage ring rotates in a clockwise manner, each of the plurality of articles enters into the cavity in the first position at about a 12 o'clock position and exits the cavity in the second position at about a 6 o'clock position.

22. The method of claim 20, wherein when the carriage ring rotates in a clockwise manner, each of the plurality of articles enters into the cavity in the first position at about a 9 o'clock position and exits the cavity in the second position after about a 6 o'clock position but before the 9 o'clock position.

23. The method of claim 20, further comprising adjusting a speed of rotation of the carriage ring based on the continuous stream of the plurality of articles, open cavities identified on the carriage ring, and empty space on an output conveyor.

* * * * *